(12) United States Patent
Czekaj et al.

(10) Patent No.: US 7,123,673 B2
(45) Date of Patent: *Oct. 17, 2006

(54) SYSTEM AND METHOD FOR TRANSMISSION OF DIGITAL INFORMATION OF VARYING SAMPLE RATES OVER A SYNCHRONOUS NETWORK

(75) Inventors: James Leo Czekaj, Northville, MI (US); Dana Thomas Sims, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 831 days.

This patent is subject to a terminal disclaimer.

(21) Appl. No.: 09/909,229

(22) Filed: Jul. 19, 2001

(65) Prior Publication Data

US 2003/0058977 A1     Mar. 27, 2003

(51) Int. Cl.
*H04B 1/10* (2006.01)

(52) U.S. Cl. .............. 375/350; 375/354; 375/295; 375/545; 375/371; 370/517; 370/503; 370/516

(58) Field of Classification Search ............... 375/354, 375/295; 370/517, 503
See application file for complete search history.

(56) References Cited

U.S. PATENT DOCUMENTS

| | | | |
|---|---|---|---|
| 4,763,319 A | 8/1988 | Rozenblit | 370/84 |
| 4,961,188 A * | 10/1990 | Lau | 370/517 |
| 5,099,234 A | 3/1992 | Kraker et al. | |
| 5,204,882 A * | 4/1993 | Chao et al. | 375/354 |
| 5,241,382 A | 8/1993 | Paik et al. | 358/133 |
| 5,260,978 A | 11/1993 | Fleischer et al. | |
| 5,303,302 A | 4/1994 | Burrows | 380/49 |
| 5,459,435 A | 10/1995 | Taki | |
| 5,469,510 A | 11/1995 | Blind et al. | 381/55 |
| 5,504,751 A | 4/1996 | Ledzius et al. | |
| 5,523,795 A | 6/1996 | Ueda | 348/480 |
| 5,541,662 A | 7/1996 | Adams et al. | 348/460 |
| 5,930,311 A | 7/1999 | Lovelace et al. | |
| 6,009,109 A | 12/1999 | Binder | |
| 6,256,358 B1 | 7/2001 | Whikehart et al. | 375/316 |
| 6,278,718 B1 * | 8/2001 | Eschholz | 370/503 |
| 6,327,273 B1 * | 12/2001 | Van der Putten et al. | 370/503 |
| 6,493,832 B1 | 12/2002 | Itakura et al. | 713/600 |
| 6,757,851 B1 | 6/2004 | Park et al. | 714/48 |
| 2003/0063684 A1* | 4/2003 | Czekaj et al. | 375/295 |

FOREIGN PATENT DOCUMENTS

| | | |
|---|---|---|
| DE | 4041625 A1 | 7/1992 |
| JP | 5037560 A1 | 2/1993 |
| JP | 10126394 A1 | 5/1998 |

* cited by examiner

*Primary Examiner*—Emmanuel Bayard
*Assistant Examiner*—Sudhanshu C. Pathak
(74) *Attorney, Agent, or Firm*—Brinks Hofer Gilson & Lione (57) ABSTRACT

A system for transmitting digital information over a synchronous network includes at least one source node and at least one sink node both coupled with the synchronous network. The source node provides source information sampled at a source sample rate (Fsi) to the synchronous network in the form of digital information. The synchronous network operates on a network master clock rate (Fn) with a frequency that may be higher, lower or equal to the source sample rate (Fsi). The digital information is transmitted over the network to the sink node. The sink node processes the digital information to generate synthesized source information.

30 Claims, 4 Drawing Sheets

SYSTEM AND METHOD FOR TRANSMISSION OF DIGITAL INFORMATION OF VARYING SAMPLE RATES OVER A SYNCHRONOUS NETWORK

BACKGROUND

1. Field of the Invention

This invention relates to synchronous networks, and more particularly, to the transmission of digital information over a synchronous network.

2. Description of the Related Art

Network transmission of data, video, images and/or voice using synchronous digital multiplex network techniques is well known. In general, transmission of digital information over the network is accomplished with a bitstream. The bitstream is produced from a source coupled to the network at an input node and is received by a sink coupled to the network at an output node.

Synchronous transmission transmits digital information in the form of network frames separated by equal time intervals. The time intervals and the network frames are fixed at a network master clock rate generated by a network master clock. Generally, synchronous transmission relies on finely controlled timing that is synchronized between the source, the network and the sink. Conversely, asynchronous transmission is non-time dependent in the sense that digital information can be transmitted at random intervals. In asynchronous mode, the digital information is coded with start bits and stop bits to indicate the beginning and end of segments of the digital information. Isochronous transmission techniques are time-dependent, however, the time-dependency provides more flexible time constraints for data transmission than the fixed time intervals of synchronous transmission.

One significant benefit of synchronous transmission over asynchronous and isochronous transmission techniques can be the minimization of uncertainty in timing between the source and the sink. Minimization of timing uncertainty minimizes irregularities in the transmitted signal typically referred to as "jitter." Jitter manifests itself as audible irregularities in audio transmissions and vibration or fluctuations of display images in video transmissions.

In synchronous networks, operation of the source and the sink are synchronized with the frequency of the network master clock. Where the sample rate (or sample frequency) of the digital information processed by the source or the sink is different from the network master clock rate, the sample rate is converted. A sample rate converter is used to convert the sample rate to the frequency of the network master clock. Accordingly, sample rate converters are needed for each source and/or each sink that operate with a sample rate different from the network master clock rate.

For synchronous networks that include multiple sources and sinks, individual sources and sinks may be operating at various sample rates higher and/or lower than the network master clock frequency. As such, significant numbers of sample rate converters may be needed to convert to, and from, the network master clock frequency. For each sample rate converter, additional circuitry and wiring is required thereby increasing the cost and complexity of the network.

BRIEF SUMMARY

The present invention is defined by the following claims, and nothing in this section should be taken as a limitation on those claims. By way of introduction, the embodiments described below include a synchronous network transmission system for transmission of source information sampled at sample rates different than a network master clock rate (Fn) of a synchronous network. Source information sampled at various sample rates may be transmitted over the synchronous network without first sample rate converting the source information. In addition, source information sampled at a sample rate in synchronism with the network master clock rate (Fn) may also be transmitted as in a conventional synchronous network. Since the transmission is over a synchronous network, jitter and other similar timing uncertainties involving the transmission may be minimized.

The synchronous network transmission system comprises at least one source node and at least one sink node. The source node produces source information sampled at a first sample rate that is a source sample rate (Fsi). The source node processes the source information. When the source sample rate (Fsi) is not synchronized with the network master clock rate (Fn), a source node provides digital information representing the source information and the corresponding source sample rate (Fsi) to the synchronous network. Conversely, where the source sample rate (Fsi) is synchronized with the network master clock rate (Fn), a source node provides digital information to the synchronous network without representation of the source sample rate (Fsi). The digital information is clocked into network frames within the synchronous network as a function of a second rate that is the network master clock rate (Fn).

The digital information is transmitted to a sink node. The sink node receives the digital information and extracts the representation of the source sample rate (Fsi) therefrom. The sink node also produces a representation of the network master clock rate (Fn). Using the representations of the source sample rate (Fsi) and the network master clock rate (Fn), the sink node sample rate converts the source information from the source sample rate (Fsi) to the network master clock rate (Fn). The sample rate converted source information is processed to produce synthesized source information. Alternatively, where the source sample rate (Fsi) and the network master clock rate (Fn) are synchronized, a sink node processes the source information without sample rate conversion.

In another embodiment, the synchronous network transmission system comprises a synchronous network, at least one source node, at least one sink node and at least one output stage. In this embodiment, representations of the source information and the corresponding source sample rate (Fsi) may be provided to the synchronous network as digital information. The digital information is received by the output stage and sample rate converted similar to the previously discussed embodiment. The output stage then transmits the sample rate converted source information over the synchronous network to the sink node. The sink node processes the sample rate converted source information to produce synthesized source information. Alternatively, where the source sample rate (Fsi) and the network master clock rate (Fn) are synchronized, the source information is transmitted directly from the source node to the sink node for processing.

Further aspects and advantages of the invention are discussed below in conjunction with the preferred embodiments.

DETAILED DESCRIPTION OF THE PREFERRED EMBODIMENTS

The below described embodiments of a synchronous network transmission system enable the transmission of digital information at various sample rates within a synchronous network. The system provides for the transmission of digital information that includes source information sampled at a first rate that is a source sample rate (Fsi). The source sample rate (Fsi) may be different than a second rate that is a network master clock rate (Fn) produced by a network master clock operating the synchronous network.

Transmission of digital information sampled at a source sample rate (Fsi) different than the network master clock rate (Fn) does not require sample rate conversion to, or any form of synchronization with, the network master clock rate (Fn). Instead, the digital information transmitted over the network represents the source information along with the source sample rate (Fsi). Synthesized source information may be produced from digital information as a function of the source sample rate (Fsi) and the network master clock rate (Fn). In addition, when the source sample rate (Fsi) is synchronized with the network master clock rate (Fn), transmission of digital information may occur as in conventional synchronous networks.

As used herein, the terms "conventional synchronous networks" and "conventional synchronization techniques" describe functionality and techniques present in prior art synchronous networks where synchronization occurs prior to transmission over the synchronous network. Synchronization may be accomplished by synchronizing the frequency of the source sample rate (Fsi) and the network master clock rate (Fn). Alternatively, synchronization may be achieved by sample rate converting the source sample rate (Fsi) to the network master clock rate (Fn).

Figure 1:
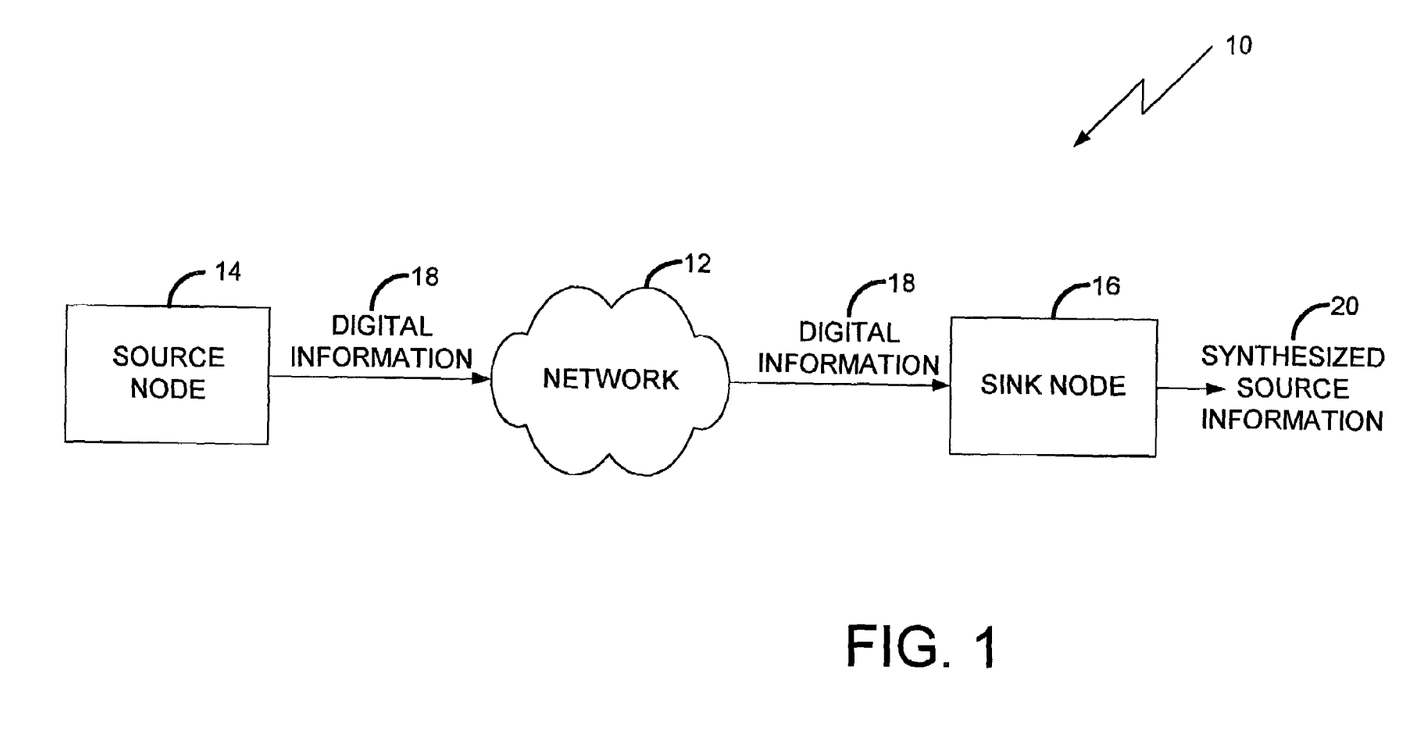
FIG. 1 is a block diagram of one embodiment of a synchronous network transmission system.

FIG. 1 illustrates a block diagram of one embodiment of a synchronous network transmission system 10. The synchronous network transmission system 10 includes a synchronous network 12, at least one source node 14 and at least one sink node 16 coupled as illustrated. As used herein, the term "coupled" may mean electrically coupled, optically coupled or any other form of coupling providing an interface between devices and/or components.

During operation, the source node 14 produces digital information 18 representative of source information. The digital information 18 is transmitted in network frames over the synchronous network 12 to the sink node 16. The sink node 16 processes the digital information 18 to produce synthesized source information 20. Although only a single source node 14 and a single sink node 16 are illustrated, a plurality of source nodes 14 and a plurality of sink nodes 16 may be operating in the synchronous network transmission system 10. In addition, a number of source nodes 14 may cooperatively operate with a single sink node 16 to transmit and process digital information 18. Further, the synchronous network transmission system 10 may include source/sink nodes with the functionality of both the source node 14 and the sink node 16. The source/sink nodes provide the capability to both send and receive digital information 18 via the synchronous network 12.

The synchronous network 12 may be any type of communication network operating with a communication standard capable of transferring digital information in network frames of a predetermined fixed period separated by equal time intervals with the timing of all nodes in the network synchronized to a network master clock. Exemplary data transfer standards for the synchronous network 12 include Media Oriented System Transport (MOST) and Domestic Databus (D2B).

As generally known in the art, synchronous networks are comprised of software applications and various devices (network cards, cables, hubs, routers, etc.) that are used to interconnect various devices and provide a communication path. The synchronous network 12 is not limited to a particular physical location and may include multiple organizations using various communication protocols. The term "synchronous network," as used herein, should be broadly construed to include any and all hardware and software applications that allow the source node 14 and the sink node 16 to be communicatively coupled to share and transfer information. The source node 14 and the sink node 16 may establish a connection to the synchronous network 12 using, for example, modems, cable modems, ISDN connections and devices, DSL connections and devices, fiber optic connections and devices, satellite connections and devices, wireless connections and devices, Bluetooth connections and devices or any other communication interface device.

Both wireline and wireless communication mediums may be included in the synchronous network 12. The communication medium(s) may be for example, communication channels, radio waves, microwave, infrared, wire transmissions, fiber optic transmissions, or any other communication medium capable of transmitting information in wireline and wireless based communication systems.

The synchronous network 12 is a synchronous digital multiplex network operating at a network master clock rate (Fn). The synchronous network 12 operates to transfer network frames in synchronization with the network master clock rate (Fn) as will be described later. In addition, the synchronous network 12 performs network management to maintain the integrity of the network, control the flow of information and control allocation of bandwidth. In addition, network management also includes directing the flow of digital information from a source node 14 to a predetermined sink node 16.

The source node 14 may be any device or configuration of devices capable of generating digital information 18 and inputting the digital information 18 into the synchronous network 12. One embodiment of the source node 14 generates source information. The source information may be in the form of data content, audio content, video content, image content; some combination of data, audio, video and/or image content; or any other content capable of transmission over the synchronous network 12.

The source information is processed by the source node 14 to generate and input digital information 18 into the synchronous network 12. When the source sample rate (Fsi) is not synchronized with the network master clock rate (Fn), the digital information 18 includes representation of the source information as well as representation of a source sample rate (Fsi). Alternatively, when synchronism occurs prior to transmission, the digital information 18 may not include representation of the source sample rate (Fsi). The source sample rate (Fsi) is the sample rate (or sample frequency) at which the source information is sampled to produce the source information in digital form. The source sample rate (Fsi) may be faster, slower or the same as the frequency of the network master clock rate (Fn).

The source node 14 operates to clock the digital information 18 into network frames within the synchronous network 12 at the network master clock rate (Fn). The network frames are created with a fixed period as a function of the network master clock rate (Fn). As described later in detail, differences between the network master clock rate (Fn) and the source sample rate (Fsi) may create redundant source information within the network frames.

The sink node 16 may be any device or configuration of devices capable of processing the digital information 18 to produce the synthesized source information 20. The sink node 16 processes the digital information 18 within each of the network frames to generate the synthesized source information 20. Where the digital information 18 does not include representation of a source sample rate (Fsi), the corresponding sink node 16 simply processes the source information without sample rate conversion. If, however, the source sample rate (Fsi) is included, the corresponding sink node 16 first performs sample rate conversion, and then further processes the source information to generate the synthesized source information 20. In one embodiment, the sink node 16 performs sample rate conversion from the source sample rate (Fsi) to the network master clock rate (Fn). In another embodiment, the source information is converted to the network master clock rate (Fn) and then to another rate for further processing with the sink node 16.

The sample rate conversion to the network master clock rate (Fn) is performed using a ratio developed from the source sample rate (Fsi) and the network master clock rate (Fn). Where the source sample rate (Fsi) is not synchronized with the network master clock rate (Fn), representation of the source sample rate (Fsi) is included within the digital information 18. Accordingly, the sink node 16 may calculate different ratios for source information processed at different source sample rates (Fsi). If, however, synchronization is present, representation of the source sample rate (Fsi) need not be included and the digital information 18 may be similar to digital information transmitted in conventional synchronous networks.

In the presently preferred embodiments, the source information is audio source information produced by the source node 14 and transferred via the network 12 to the sink node 16 for reproduction. The audio source information may be in digital or analog form and is processed to produce the digital information 18. The source information may be sampled at a source sample rate (Fsi) that is greater than, less than, or equal to the network master clock rate (Fn).

In these embodiments, the sink node 16 is included in a vehicle or other mobile device that receives digital information 18 transmitted with wireless communications. If required, the sink node 16 performs sample rate conversion of the source information using the source sample rate (Fsi) and the network master clock rate (Fn). The source information of these embodiments is sample rate converted to the network master clock rate (Fn). In addition, the sink node 16 processes the sample rate converted source information to generate synthesized audio source information. The synthesized audio source information is a reproduction of the audio source information produced by the source node 14.

Figure 2:
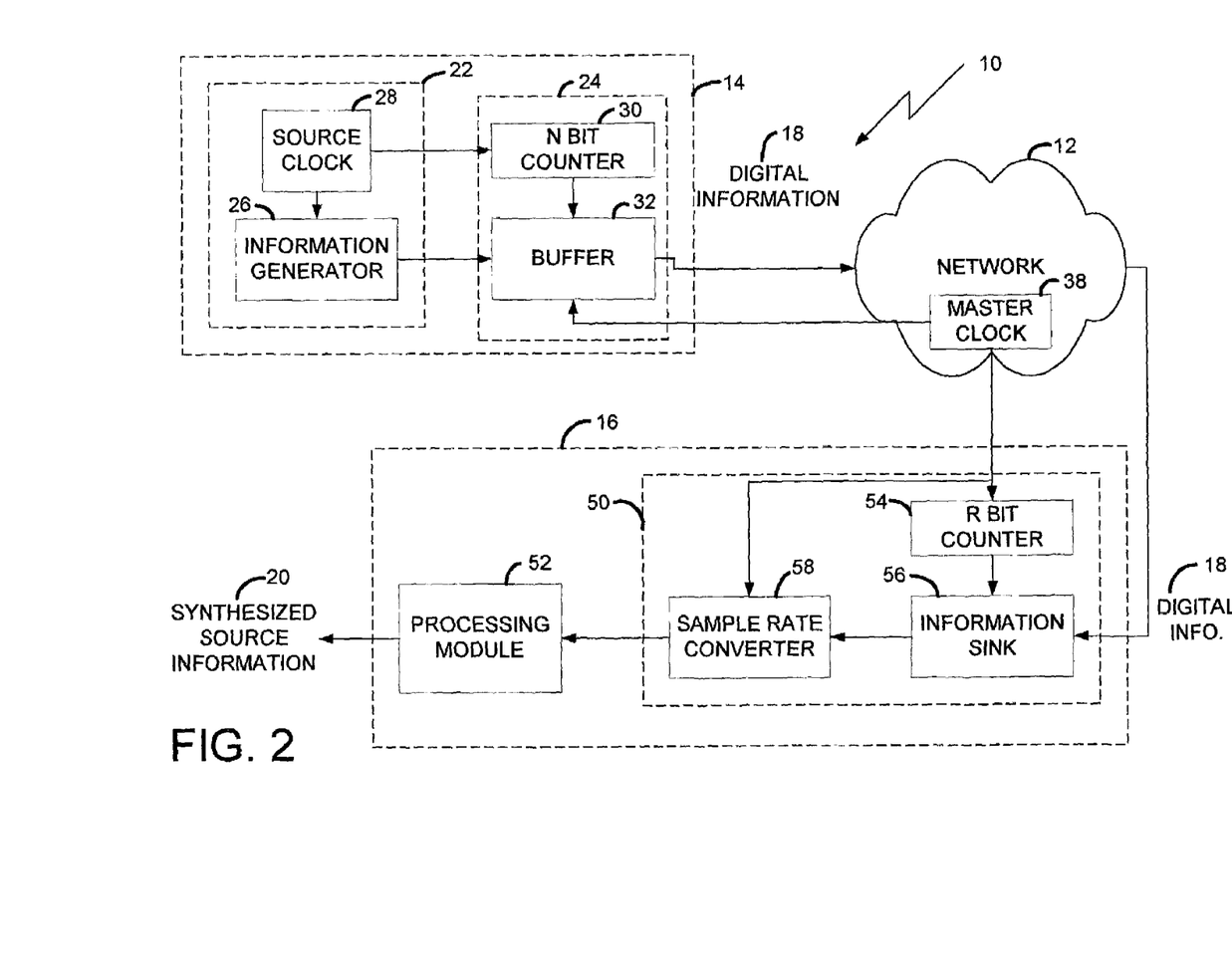
FIG. 2 is an expanded block diagram of a portion of the synchronous network transmission system illustrated in FIG. 1.

FIG. 2 is a more detailed block diagram of the synchronous network transmission system 10 illustrated in FIG. 1 that includes the synchronous network 12, the source node 14 and the sink node 16. One embodiment of the source node 14 includes a source 22 and an input stage 24 coupled as illustrated. Another source node 14 (not shown) is similar to well-known source nodes operating with conventional synchronization techniques to provide source information at a sample rate synchronized with the network master clock rate (Fn).

The source 22 may be any device capable of generating source information. The source information may be in analog or digital form and is provided to the input stage 24 coupled thereto. The source 22 may be located remotely from the input stage 24 or, may be proximate to the input stage 24. In another embodiment, the source 22 may be transmitting source information in digital form over the network 12 to the input stage 24.

In the illustrated embodiment, the source 22 includes an information generator 26 and a source clock 28 coupled as illustrated. The information generator 26 may be any mechanism or device capable of generating the source information. In the presently preferred embodiments, the source information provided by the information generator 26 is audio source information. Exemplary producers of audio source information include an AM/FM tuner, a compact disk player, an MP3 audio source, a satellite digital radio, a human machine interface (HMI), a voice command module or any other device capable of producing audio content. In other embodiments, the information generator 26 may produce video source information, data source information, image source information, some combination of audio, video, image and/or data, or any other form of source information capable of transmission over the synchronous network 12.

The source information produced by the information generator 26 of the illustrated embodiment is in digital form. The source information is sampled at the source sample rate (Fsi) produced by the source clock 28. In other embodiments, the information generator 26 may produce the source information in analog form and the source clock 28 may be omitted from the source 22. In these embodiments, the source information is subsequently converted to digital form by an analog-to-digital (A/D) converter operating at the source sample rate (Fsi) and then input into the buffer 32.

The source clock 28 may be any time-keeping circuit or device capable of producing some form of timing signal at a frequency that is the source sample rate (Fsi). Well-known time-keeping devices include a data strobe, an oscillating clock or any other form of timing device or mechanism.

The input stage 24 may be any circuit or device capable of processing the source information to produce and input digital information 18 to the synchronous network 12. In the illustrated embodiment, the input stage 24 includes an N-bit counter 30 and a buffer 32. The N-bit counter 30 is coupled with the source clock 28 and the buffer 32 as illustrated. The N-bit counter 30 operates in a well-known manner to count the frequency of the timing signals produced by the source clock 28. In addition, the N-bit counter 30 provides a source counter value (CV(m)) as an output signal to the buffer 32. An exemplary N-bit counter is the event counter mechanism in a Motorola DSP56362 digital signal processor.

The buffer 32 is also coupled with the information generator 26 and operates in a well-known manner to temporarily store the source information. In addition, the buffer 32 stores the most recent source counter value (CV(m)). An exemplary buffer may be a well-known random access memory (RAM).

During operation, the buffer 32 temporarily stores the source information and the source counter value (CV(m)) in a predetermined number of bits. The buffer 32 is emptied as a function of the network master clock rate (Fn) when the predetermined number of bits is clocked into the synchronous network 12. When the buffer 32 is emptied, additional source information and the current source counter value (CV(m)) are again stored in the buffer 32 as a function of the source sample rate (Fsi).

In another embodiment, the input stage 24 includes a conventional analog-to-digital converter and the source clock 28. In this embodiment, the source information is provided from the source 22 in analog form. Accordingly, the input stage 24 digitizes the source information at the source sample rate (Fsi) provided by the source clock 28. As in the previous embodiments, the digitized source information and the source counter value (CV(m)) are input into the synchronous network 12 via the buffer 32.

As illustrated in FIG. 2, the synchronous network 12 includes a network master clock 38. The network master clock 38 may be any timing mechanism capable of providing network-timing signals representing the network master clock rate (Fn). An exemplary timing mechanism is a low jitter phase lock loop (PLL) device such as an Oasis Silicon Systems AG OSS8104. The network master clock 38 is coupled with the source node 14 and the sink node 16 as illustrated. Operation of the network master clock 38 provides synchronism between the source node 14 and the sink node 16 during transmissions over the synchronous network 12. The network master clock 38 also provides the timing for generation of the network frames.

Figure 3:
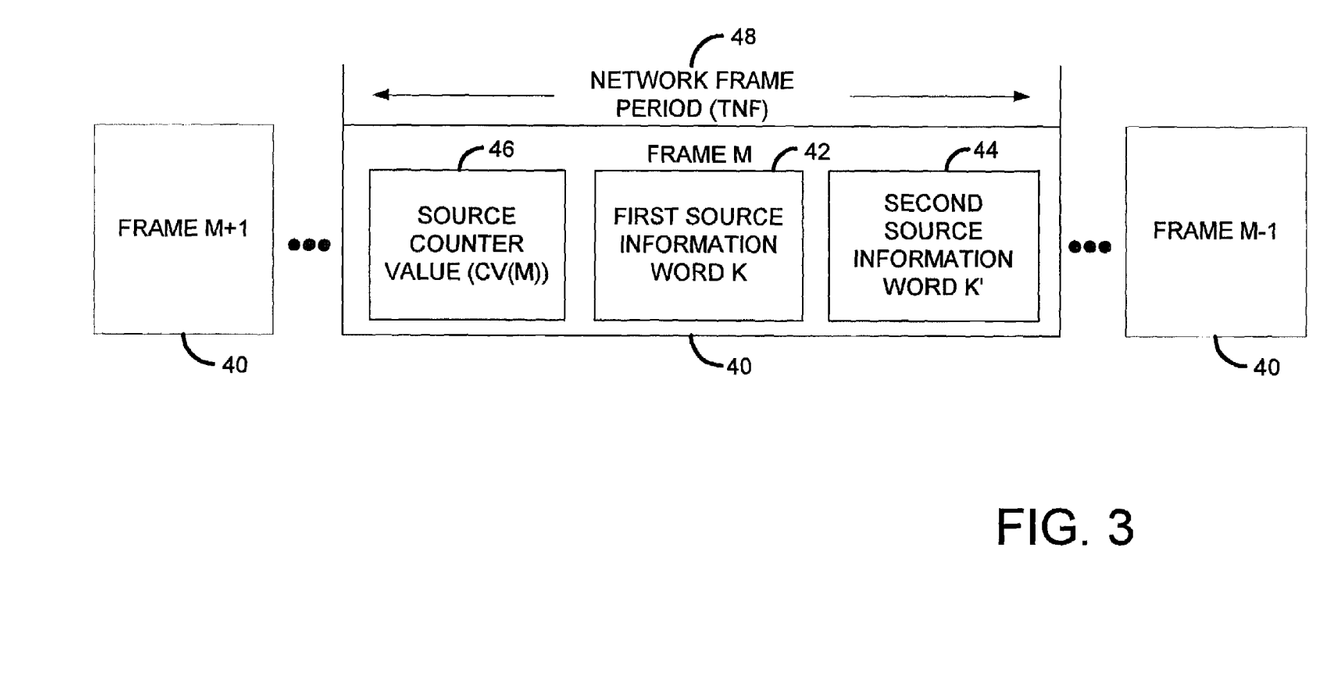
FIG. 3 is a block diagram depicting a plurality of network frames transmitted by the synchronous network transmission system of FIG. 1.

FIG. 3 is a block diagram illustrating a plurality of network frames 40 transmitted in one embodiment of the synchronous network 12. The network frames 40 are (m) network frames illustrated as Frame m, Frame m+1 and Frame m−1 to represent a portion of the digital information clocked into the synchronous network 12. Additional detail has been included in Frame m to illustrate the digital information represented in each of the network frames 40. In the illustrated embodiment, Frame m includes a first source information word (k) 42, a second source information word (k') 44 and a source counter value (CV(m)) 46. In other embodiments, additional source information words may be included in each of the network frames 40. Although not illustrated, other network frames 40 may represent synchronized digital information clocked into the synchronous network 12 (FIG. 1) using conventional synchronization techniques. In conventional synchronous techniques, the network frames 40 do not include the source counter value (CV(m)) 46.

Each of the network frames 40 is represented by a fixed predetermined network frame period (Tnf) 48. In addition, the first source information word (k) 42, the second source information word (k') 44 and the source counter value (CV(m)) 46 are a fixed predetermined number of bits within each of the network frames 40. The length, or period, of the network frame period (Tnf) 48 is a function of the number of bits therein. In one embodiment, the network frame period (Tnf) for the synchronous network 12 is fixed at 72 bits. In other embodiments, the network frame period (Tnf) may include fewer or greater numbers of bits.

The first and second source information words (k and k') 42, 44 represent a predetermined quantity of bits of the source information sampled at the source sample rate (Fsi). For example, where the source information is stereo audio source information, the first and second source information words (k and k') 42, 44 may each be four bytes representing the audio source information; two bytes representing the left channel, and two bytes representing the right channel. In another example where the source information is mono audio source information, the first and second source information words (k and k') 42, 44 may each be one byte representing the audio source information.

The source counter value (CV(m)) 46 is a digital representation of the frequency (sample rate) of the source sample rate (Fsi). The value of the source counter value (CV(m) 46 within each of the network frames 40 represents the source sample rate (Fsi) during generation of the source information represented by the first and second source information words (k and k') 42, 44. The source counter value (CV(m)) 46 of one embodiment is an ascending counter value represented by, for example, one byte.

The information content of the first and second source information words (k and k') 42, 44 is dependent on the source sample rate (Fsi) and the network master clock rate (Fn). More specifically, the first and second source information words (k and k') 42, 44 may include redundant or non-redundant information content depending on the ratio of the source sample rate (Fsi) and the network master clock rate (Fn). For example, where the frequency of the source sample rate (Fsi) is less than the network master clock rate (Fn), digital information is clocked into the synchronous network 12 faster than new source information is sampled. Accordingly, at least one of the first and second source information words (k and k') 42, 44 may represent source information redundant to source information already clocked into the network frames 40.

Where, for example, the frequency of the source sample rate (Fsi) is faster than the network master clock rate (Fn), source information is sampled faster than the digital information is clocked into the synchronous network 12. In these cases, the source information represented in the first and the second source information words (k and k') 42, 44 may or may not be redundant. Accordingly, some of the network frames 40 may include source information representing redundant source information and other network frames 40 may include only non-redundant source information.

Referring again to FIG. 2, the embodiment of the sink node 16 includes an output stage 50 and a processing module 52 coupled as illustrated. Another sink node 16 (not illustrated) may include only the processing module 52, to process source information with a sample rate synchronized with the network master clock rate (Fn).

The output stage 50 may be any integrated circuit or other device capable of obtaining the ratio between the source sample rate (Fsi) and the network master clock rate (Fn) and sample rate converting the source information as a function of the ratio. In the illustrated embodiment, the output stage 50 includes an R bit counter 54, an information sink 56 and a sample rate converter 58.

The R bit counter 54 may be any circuit or device capable of counting the frequency of the network master clock rate (Fn) and providing a network counter value (NCV) as an output to the data sink 56. An exemplary counter is the event counter mechanism in a Motorola DSP56362 digital signal processor.

The information sink 56 may be any conventional storage device operating as a buffer to temporarily store the network counter value (NCV) and the digital information 18 supplied over the synchronous network 12 in the network frames 40 (FIG. 3). An exemplary buffer is a well-known random access memory. The number of network frames 40 stored in the information sink 56 is dependent on the sample rate conversion scheme utilized in the sample rate converter 58.

The sample rate converter 58 may be any conventional sample rate conversion device or technique capable of interfacing with the information sink 56 to extract the digital information 18 and the network counter value (NCV) therefrom. In the illustrated embodiment, the sample rate converter 58 is also capable of monitoring the master clock rate (Fn) directly to identify output interrupts. An exemplary sample rate converter 58 is a digital signal-processing (DSP) chip operating with software that performs the sample rate conversion. Conventional sample rate converters use the ratio between an existing sample rate and a desired sample rate to convert from the existing sample rate to the desired sample rate. In the presently preferred embodiments, the existing sample rate is the source sample rate (Fsi) and the desired sample rate is the network master clock rate (Fn).

In these embodiments, the sample rate converter 58 is capable of estimating the ratio of the source sample rate (Fsi) and the network master clock rate (Fn). Estimation of the ratio is performed using the source counter value (CV(m)) for the source sample rate (Fsi) and the network counter value (NCV) for the network master clock rate (Fn) as follows:

$$\frac{\text{source counter value }(CV(m))}{\text{network counter value }(NCV)} \quad \text{Equation 1}$$

Referring now to FIGS. 2 and 3, during operation, when the source counter value (CV(m)) 46 is extracted from one of the network frames 40, the sample rate converter 58 estimates the ratio of the source sample rate (Fsi) and the network master clock rate (Fn). The value of the source counter value (CV(m) 46 is used to indicate when the first source information word (k) 42 and/or the second source information word (k') 44 are redundant to previously received information. The sample rate converter 58 may ignore redundant information.

The following examples illustrate the sample rate conversion operation when the source information words illustratively depicted as (w0, w1, w2, w3, w4, w5, w6, w7, w8, w9 . . . ) are transmitted over the synchronous network 12 from the source node 14 to the sink node 16. Each source information word (w0, w1 . . . ) may be one of the first source information word (k) 42 or the second source information word (k') 44 within one of the network frames 40.

The below examples are illustrated in terms of a number (m) assigned to each of the network frames 40, the corresponding source counter value (CV(m)) 46 and the first and second source information words (k, k') 42, 44. The number (m) of each of the network frames 40 is indicative of the network counter value (NCV) provided by the master clock rate (Fn). In addition, the source counter value (CV(m)) 46 is indicative of the source sample rate (Fsi). Bolded italicization is used in the below examples to indicate those source information words (w0, w1 . . . ) that are redundant and therefore may not be used during sample rate conversion by the sample rate converter 58.

If, for example, the ratio is estimated by the sample rate converter 58 to be Fsi=Fn, then:

| m | CV(m) | k¹ | k |
|---|---|---|---|
| 1 | 1 | w0 | w1 |
| 2 | 2 | w1 | w2 |

-continued

| m | CV(m) | k¹ | k |
|---|---|---|---|
| 3 | 3 | w2 | w3 |
| 4 | 4 | w3 | w4 |
| 5 | 5 | w4 | w5 |
| 6 | 6 | w5 | w6 |

This example illustrates operation where the source sample rate (Fsi) is estimated to be synchronized with the rate of the synchronous network 12. Since the rates are the same, one source information word (w0, w1, . . . ) is available when the digital information 18 is clocked into each of the network frames 40. Accordingly, following the transmittal of the initial network frame (m=1), the second source information word (k') 44 is always redundant to a source information word (w0, w1, . . . ) previously clocked into the synchronous network 12. As illustrated by bolded italicization, the first source information word (k) 42 of each network frame (m) is used for sample rate conversion by the sample rate converter 58 and the second source information word (k') 44 may be ignored.

Although this example illustrates synchronous operation, conventional synchronous operation is not represented since the ratio is estimated and used in sample rate conversion. In this example, the ratio was estimated to be exactly 1.00, however, the ratio could also be estimated to be, for example, 0.95 or 1.05 where the source sample rate (Fsi) and the network master clock rate (Fn) do not remain exactly synchronized. Conversely, conventional synchronous operation relies on the source sample rate (Fsi) and the network master clock rate (Fn) remaining exactly synchronized at all times making estimation of the ratio unnecessary.

If, for example, the ratio is estimated to be about Fsi=1.5Fn, then:

| m | CV(m) | k¹ | k |
|---|---|---|---|
| 1 | 1 | w0 | w1 |
| 2 | 3 | w2 | w3 |
| 3 | 4 | w3 | w4 |
| 4 | 6 | w5 | w6 |
| 5 | 7 | w6 | w7 |
| 6 | 9 | w8 | w9 |
| 7 | 10 | w9 | w10 |

In this example, the network master clock rate (Fn) at which the digital information 18 is clocked into the synchronous network 12 is estimated to be slower than the source sample rate (Fsi). In some of the network frames 40, the first and second source information words (k, k') 42, 44 are non-redundant source information words. In other network frames 40, however, the same source information word (w0, w1, . . . ) is clocked into one of the network frames multiple times as illustrated by the appearance of w3 in network frame m=2 and network frame m=3. Through ratio estimated with the source counter value (CV(m)) 46 and the network counter value (NCV), the redundant source information words (w0, w1 . . . ) may be ignored as indicated by bolded italicization in the above example.

In another example, if the ratio is estimated to be about Fsi=2Fn, then:

| m | CV(m) | k¹ | k |
|---|---|---|---|
| 1 | 1 | w0 | w1 |
| 2 | 3 | w2 | w3 |
| 3 | 5 | w4 | w5 |
| 4 | 7 | w6 | w7 |
| 5 | 9 | w8 | w9 |
| 6 | 11 | w10 | w11 |
| 7 | 13 | w12 | w13 |
| 8 | 15 | w14 | w15 |

Since the source sample rate (Fsi) is estimated to be about twice the network master clock rate (Fn), the first and second source information words (k, k') 42, 44 will ways be non-redundant source information words (w0, w1, . . . ) that are used in sample rate conversion by the sample rate converter 58. In this example, the maximum ratio is 2 due to the number of source information words (w0, w1, . . . ) in each of the network frames 40. Where the network frames 40 provide for transmission of more source information words (w0, w1, . . . ) in each of the network frames 40, the maximum ratio of the source sample rate (Fsi) and the network master clock rate (Fn) may become correspondingly larger without the loss of transmitted information.

If, for example, the ratio is estimated to be about Fsi=Fn/2, then:

| m | CV(m) | k¹ | k |
|---|---|---|---|
| 1 | 1 | w0 | w1 |
| 2 | 1 | w0 | w1 |
| 3 | 2 | w1 | w2 |
| 4 | 2 | w1 | w2 |
| 5 | 3 | w2 | w3 |
| 6 | 3 | w2 | w3 |
| 7 | 4 | w3 | w4 |
| 8 | 4 | w3 | w4 |

Here, the frequency of the source sample rate (Fsi) is estimated to be half of the frequency of the network master clock rate (Fn). Accordingly, some of the network frames 40 will include only redundant source information words (w0, w1, . . . ), some will include no redundant source information words (w0, w1, . . . ) and some will include a combination of redundant and non-redundant source information words (w0, w1, . . . ). As illustrated by bolded italicization, the sample rate converter 58 may use the comparison of the source counter value (CV(m)) 46 with the network counter value (NCV) to disregard redundant source information words (w0, w1, . . . ).

In this example, conventional synchronization techniques could possibly be used so long as the source sample rate (Fsi) remains an exact whole number multiple of the network master clock rate (Fn), and the source sample rate (Fsi) remains synchronized exactly with the network master clock rate (Fn). As illustrated in the above example, exact synchronization provides the same repeatable pattern of redundant source information words (w0, w1, . . . ) in each of the network frames. As such, a static repeatable pattern could be used in conjunction with conventional synchronization techniques to assume and ignore redundant source information words.

If however, the multiplier is a nominal value subject to variation, or not an exact multiple, the pattern in each of the network frames are not always be repeatable. In this case, a static repeatable pattern used in conjunction with conventional synchronization techniques would erroneously assume redundant source information words (w0, w1, . . . ). Conversely, the embodiments of the synchronous network transmission system 10 are capable of accommodating variations and inexact multipliers since synchronization of the source sample rate (Fsi) and the network master clock rate (Fn) may or may not occur. Multiplier variations and inexact multipliers are tracked via the ratio to identify redundant source information words (w0, w1 . . . ) in each of the network frames 40.

The previous examples illustrate only some of the many possible ratios that may occur between the source sample rate (Fsi) and the network master clock rate (Fn). In addition, the output stage 50 may sample rate convert source information from a number of different source nodes 14 operating at various source sample rates (Fsi). Further, in other embodiments, the output stage 50 may include additional sample rate conversion capabilities to convert the source information from the network master clock rate (Fn) to another rate compatible with the operation of the processing module 52.

Referring again to FIG. 2, the processing module 52 is electrically coupled with the output stage 50 and receives the sample rate converted source information therefrom. The processing module 52 may be any circuit configuration or device that includes the capability to generate synthesized source information 20 from the sample rate converted source information. The processing module 52 may include a digital-to-analog converter, filtering or any other processing capabilities to perform the synthesis. The operational capabilities of the processing module 52 are dependent on the information content represented by the sample rate converted source information and the content desired in the synthesized source information 20.

In one embodiment, the source information is audio source information. In this embodiment, the processing module 52 may be any circuit configuration or device that includes the capability to perform conversion from digital to analog. In addition, the processing module 52 includes capability to manipulate audible parameters pertaining to the audio source information. Exemplary audible parameters include volume, tone, balance, equalization, reverberation, concert hall effects or any other types of processing to adjust sound imaging of the synthesized audio source information. Exemplary processing modules include an amplifier, a human machine interface (HMI) and a voice command module.

Figure 4:
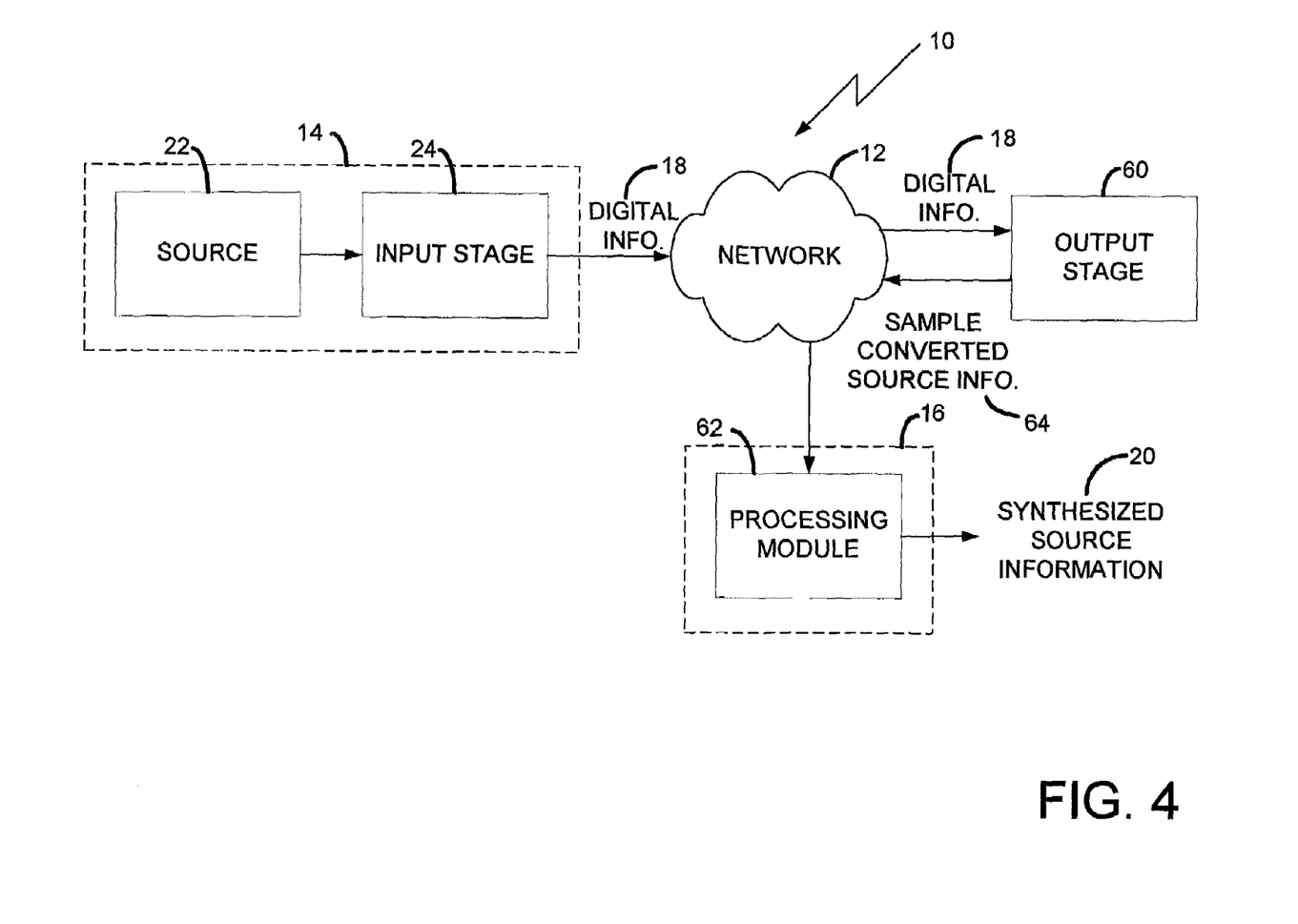
FIG. 4 is a block diagram of another embodiment of a synchronous network transmission system.

FIG. 4 illustrates another embodiment of the synchronous network transmission system 10 that includes the synchronous network 12, at least one source node 14, at least one sink node 16 and at least one output stage 60 electrically coupled as illustrated. The synchronous network 12 and the source node 14 are similar in configuration and operation to the synchronous network 12 and the source node 14 previously described with reference to FIGS. 2 and 3.

The sink node 16 of this embodiment includes a processing module 62. The configuration and operation of the processing module 62 is similar in many respects to the processing module 52 previously discussed with reference to FIG. 2. In this embodiment, however, the processing module 62 is directly coupled with the synchronous network 12. The processing module 62 also includes the capability to receive and process digital information sent over the synchronous network 12 to produce synthesized source information 20. Digital information received by the processing module 62 may be sent over the synchronous network 12 from the output stage 60 or may be sent directly from the source node 14. Digital information received directly from the source node 14 includes source information synchronized with the network master clock rate (Fn) prior to transmission. Conversely, digital information received by the output stage 60 includes source information sampled at a sample rate that is not synchronized with the network master clock rate (Fn).

The output stage 60 is similar in operation and configuration to the output stage 50 previously discussed with reference to FIG. 2. The output stage 60 of this embodiment receives the digital information 18 and performs sample rate conversion of the source information. In addition, the output stage 60 includes the capability to transmit sample rate converted source information 64 over the synchronous network 12 to the processing module 62. Accordingly, the output stage 60 may be physically located remote from the processing module 62 yet still provide sample rate converted source information 64 to the processing module 62.

During operation of this embodiment, source information may be sampled at a source sample rate (Fsi) that is different from the network master clock rate (Fn). The source information along with the source counter value (CV(m)) is represented by the digital information 18. The digital information 18 may be clocked into the synchronous network 12 at the network master clock rate (Fn). The output stage 60 receives the digital information 18 and extracts the source counter value (CV(m)) therefrom. In addition, the output stage 60 obtains the network counter value (NCV) generated as a function of the network master clock rate (Fn).

Using the source counter value (CV(m) and the network counter value (NCV), the output stage 60 estimates the ratio of the source sample rate (Fsi) and the network master clock rate (Fn) as previously discussed. The output stage 60 then sample rate converts the source information to the network master clock rate (Fn) with the estimated ratio. The sample rate converted source information 64 is transmitted over the synchronous network 12 to the sink node 16. Since the sample rate of the sample converted source information 64 is the same as the network master clock rate (Fn), the sample rate converted source information 64 is clocked into the synchronous network, transmitted and received as in conventional synchronous networks.

The processing module 62 within the sink node 16 operates with the same frequency as the network master clock rate (Fn). The processing module 62 receives the sample rate converted source information 64 and performs further processing to produce the synthesized source information 20. In one embodiment, one output stage 60 is used to sample rate convert source information transmitted to one processing module 62. In another embodiment, one output stage 60 sample rate converts source information transmitted to a plurality of processing modules 62. In yet another embodiment, a plurality of output stages 60 perform sample rate conversion for at least one processing module 62.

The previously discussed embodiments of the synchronous network transmission system 10 allow the transmission over the synchronous network 12 of source information processed at various source sample rates (Fsi). The various source sample rates (Fsi) may be less than, greater than, or equal to the network master clock rate (Fn). In addition, source information may be synchronized with the network master clock rate (Fn) and transmitted over the synchronous network 12 as in conventional synchronous networks. Synchronization with the network master clock rate (Fn) may involve sample rate converting the source information to the rate of the network master clock 38 to synchronize the source information with the synchronous network.

In the presently preferred embodiments, sample rate conversion prior to transmission may be avoided by using the ratio of the source sample rate (Fsi) and the network master clock rate (Fn) to extract and sample rate convert the source information following transmission. When the ratio technique is utilized, at least two source information words are accomodated in each network frame, along with representation of the source sample rate (Fsi). Since the source information words may include redundant and non-redundant source information, the frequency of the various source sample rates (Fsi) may be either higher, lower or equal to the network master frame rate (Fn) without loss of information.

While the invention has been described above by reference to various embodiments, it will be understood that many changes and modifications can be made without departing from the scope of the invention. It is therefore intended that the foregoing detailed description be understood as an illustration of the presently preferred embodiments of the invention, and not as a definition of the invention. It is only the following claims, including all equivalents that are intended to define the scope of this invention.

What is claimed is:

1. A method of transmitting digital information over a synchronous network, the method comprising:
    processing source information at a first rate to generate digital information;
    clocking the digital information without sample rate conversion into the synchronous network at a second rate, the second rate different than the first rate;
    receiving the digital information over the synchronous network;
    determining a ratio of the first rate and the second rate;
    identifying redundant source information in the digital information based on the ratio; and
    sample rate converting only the non-redundant source information.

2. The method of claim 1, wherein the first rate is a different frequency than the second rate.

3. The method of claim 1, wherein processing source information comprises:
    counting the first rate to generate a source counter value (CV(m)); and
    transmitting the source counter value (CV(m)) as part of the digital information.

4. The method of claim 1, wherein receiving the digital information comprises buffering the digital information.

5. The method of claim 1, wherein clocking the digital information comprises inputting at least two source information words into a network frame for transmittal over the synchronous network.

6. The method of claim 1, further comprising processing the source information that has been sample rate converted to produce synthesized source information.

7. The method of claim 1, further comprising:
    transmitting sample rate converted source information over the synchronous network;
    receiving the sample rate converted source information; and
    processing the sample rate converted source information to produce synthesized source information.

8. The method of claim 1, wherein wherein sample rate converting comprises sample rate converting the first rate to the second rate.

9. The method of claim 1, further comprising:
processing additional source information in synchronism with the second rate to produce additional digital information;
clocking the additional digital information into the synchronous network at the second rate;
receiving the additional digital information over the synchronous network; and
processing the additional digital information absent sample rate conversion to produce synthesized source information.

10. A method of processing source information for transmission over a synchronous network, the method comprising:
sampling source information at a source sample rate (Fsi);
clocking the source information that is sampled at the source sample rate (Fsi) into a network frame on the synchronous network at a network master clock rate (Fn), wherein a ratio of the source sample rate (Fsi) and the network master clock rate (Fn) is less than or equal to the number of source information words within the network frame;
counting the frequency of the source sample rate (Fsi) during sampling
producing a source counter value (CV(m)); and
clocking the source counter value (CV(m)) into the network frame at the network master clock rate (Fn).

11. The method of claim 10, further comprising:
transmitting the network (rune over the synchronous network; and
sample rate converting the source information to the network master clock rate (Fn) as a function of the source counter value (CV(m)) and the network master clock rate (Fn).

12. The method of claim 10, wherein clocking the source information comprises inputting at least two source information words into the network frame.

13. The method of claim 10, further comprising buffering the source information and the source counter value (CV (m)).

14. The method of claim 10, wherein sampling source information comprises generating the sample rate with a source clock, the source clock operating at a different frequency than the frequency of the network master clock rate (Fn).

15. The method of claim 10, wherein clocking the source information comprises clocking redundant source information into the network frame as a function of the source sample rate (Fsi) and the network master clock rate (Fn).

16. A method of processing source information transmitted over a synchronous network as digital information, the method comprising:
counting the frequency of a network master clock rate (Fn) to produce a network counter value (NCV);
extracting a source counter value (CV(m)) from digital information transmitted over the synchronous network, the source counter value (CV(m)) representative of the sample rate of the source information, wherein the digital information comprises a plurality of source information words disposed in a network frame; and
sample rate converting the source information as a function of the network counter value (NCV) and the source counter value (CV(m)), wherein a ratio of the network counter value (NCV) and the source counter value (CV(m)) is less than or equal to the number of source information words within the network frame.

17. The method of claim 16, further comprising processing the source information that has been sample rate converted to generate synthesized source information.

18. The meted of claim 16, further comprising:
transmitting the sample rate converted source information over the synchronous network to a processing module; and
generating synthesized source information with the processing module.

19. The method of claim 16, wherein sample rate converting the source information comprises selectively ignoring a portion of the source information when the ratio of the source counter value (CV(m)) and the network counter value (NCV) is less than the number of source information words within the network frame.

20. The method of claim 16, wherein sample rate converting the source information comprises sample rate converting the source information to the network master clock rate (Fn).

21. A system for transmitting digital information at various sample rates over a synchronous network, the system comprising:
a source node operable to generate digital information, the digital information comprising source information sampled at a first rate; and
a synchronous network coupled with the source node, the synchronous network operable at a second rate different than the first rate, the digital information clocked into the synchronous network at the second rate absent sample rate conversion;
wherein the digital information is clocked into the synchronous network in a plurality of network frames, each of the network frames comprising at least two source information words; and
wherein a ratio of the first rate and the second rate is less than or equal to the number of source information words in each of the network frames.

22. The system of claim 21, further comprising a sink node coupled with the synchronous network, the sink node operable to process digital information received over the synchronous network to generate synthesized source information.

23. The system of claim 22, wherein the sink node comprises an output stage coupled with a processing module, the output stage operable to sample rate convert the source information from the first sample rate to the second sample rate and the processing module operable to process the sample rate converted source information and generate synthesized source information.

24. The system of claim 21, further comprising an output stage coupled with the synchronous network, the output stage operable to sample rate convert the source information received over the synchronous network to the second rate and input sample rate converted source information into the synchronous network.

25. The system of claim 24, further comprising a sink node coupled with the synchronous network, the sink node operable to receive the sample rate converted source information over the synchronous network and generate synthesized source information.

26. The system of claim 21, wherein the source node comprises a source and an input stage, the source operable to provide source information and the input stage operable to generate the digital information as a function of the source information.

27. The system of claim 21, wherein the first rate is a source sample rate (Fsi) generated by a source clock.

28. The system of claim 21, wherein the second rate is a network master clock rate (Fn) generated by a network master clock.

29. The system of claim 21, wherein the digital information further comprises a source counter value (CV(m)), the source counter value (CV(m)) representative of the first rate and included in each of the network frames.

30. The system of claim 21, wherein the digital information is also clocked into the synchronous network at the second rate following sample rate conversion to the second rate.

* * * * *

UNITED STATES PATENT AND TRADEMARK OFFICE
CERTIFICATE OF CORRECTION

PATENT NO. : 7,123,673 B2
APPLICATION NO. : 09/909229
DATED : October 17, 2006
INVENTOR(S) : James Leo Czekaj et al.

It is certified that error appears in the above-identified patent and that said Letters Patent is hereby corrected as shown below:

Column 15
Line 29, delete "(rune" and inset --frame--.

Column 16
Line 4, delete "meted" and insert --method--.

Signed and Sealed this

Sixteenth Day of January, 2007

JON W. DUDAS
*Director of the United States Patent and Trademark Office*